(12) United States Patent
Sato (10) Patent No.: US 12,418,619 B2
(45) Date of Patent: Sep. 16, 2025

(54) SYSTEM AND METHOD FOR PROVIDING INFORMATION TO PROPERLY MAINTAIN AN IMAGE PROCESSING APPARATUS

(71) Applicant: CANON KABUSHIKI KAISHA, Tokyo (JP)

(72) Inventor: Yuichiro Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/421,749

(22) Filed: Jan. 24, 2024

(65) Prior Publication Data

US 2024/0259507 A1    Aug. 1, 2024

(30) Foreign Application Priority Data

Jan. 27, 2023    (JP) ................. 2023-010649

(51) Int. Cl.
*H04N 1/00*    (2006.01)

(52) U.S. Cl.
CPC ..... *H04N 1/00344* (2013.01); *H04N 1/00037* (2013.01); *H04N 1/00068* (2013.01)

(58) Field of Classification Search
None
See application file for complete search history.

(56) References Cited

U.S. PATENT DOCUMENTS

| | | | | |
|---|---|---|---|---|
| 2013/0114100 A1* | 5/2013 | Torii | ................. | H04N 1/00037 358/1.14 |
| 2019/0324833 A1* | 10/2019 | Kobayashi | ............ | G06F 3/1234 |

FOREIGN PATENT DOCUMENTS

| | | | | | |
|---|---|---|---|---|---|
| JP | 2000181957 | * | 6/2000 | ............. | G05B 15/02 |
| JP | 2006350923 | * | 12/2006 | ............. | G03G 21/00 |
| JP | 2007304934 | * | 11/2007 | ............. | G06Q 50/00 |
| JP | 2008211662 | * | 9/2008 | ............. | B41J 29/38 |
| JP | 2017182303 | * | 10/2017 | ............. | B41J 29/38 |
| JP | 2017224133 | A | 12/2017 | | |
| JP | 2020004403 | * | 1/2020 | ............. | G06Q 10/00 |

* cited by examiner

*Primary Examiner* — Beniyam Menberu
(74) *Attorney, Agent, or Firm* — Canon U.S.A., Inc. IP Division (57) ABSTRACT

A system, upon receiving a request for providing information about a part identified to take action for a predetermined error that has occurred in an image processing apparatus, provides data for displaying the information about the identified part and maintenance information together as a response to the request. The maintenance information displayed based on the data includes maintenance information corresponding to an error ID of the predetermined error and maintenance information, included in managed maintenance information, corresponding to specific identification information of the image processing apparatus in which the predetermined error has occurred.

5 Claims, 8 Drawing Sheets

← RETURN TO ALERT LIST OF DEV0000001 — 601

E001-0001 ↗ — 602
DATE AND TIME OF OCCURRENCE: 2022/09/03 11:10:00 — 603

DETERMINATION INFORMATION

TONER BOTTLE (Y)
Part1-111
58.0%
B — A
— 604

HOPPER UNIT (Y)
Part2-222
22.8%
B A C

DISPLAY ALL — 605

MAINTENANCE INFORMATION — 606

SI035-0220-10
[IMPORTANCE HIGH] REGARDING ERROR IN E001-0001 ↗

SI040-0330-20
[IMPORTANCE MIDDLE] REGARDING FAILURE IN XXX ↗

← RETURN TO ALERT LIST OF DEV0000001

E001-0001
DATE AND TIME OF OCCURRENCE: 2022/09/03 11:10:00

DETERMINATION INFORMATION

SI035-0220-10
[IMPORTANCE HIGH] REGARDING ERROR IN E001-0001

TONER BOTTLE (Y)
Part1-111
58.0%
B — A

HOPPER UNIT (Y)
Part2-222
22.8%
B A C

DISPLAY ALL

MAINTENANCE INFORMATION

SI040-0330-20
[IMPORTANCE MIDDLE] REGARDING FAILURE IN XXX

SYSTEM AND METHOD FOR PROVIDING INFORMATION TO PROPERLY MAINTAIN AN IMAGE PROCESSING APPARATUS

BACKGROUND

Field of the Disclosure

The present disclosure relates to a technique for providing information to properly maintain an image processing apparatus, such as a printer.

Description of the Related Art

Conventionally, management systems that manage information and states of image processing apparatuses (hereinbelow referred to as devices), such as printers, copying machines, and multifunction peripherals, have been constructed. If a failure occurs in a device in such a system, a server receives a failure notification transmitted from the device, and thus the system can manage a failure occurrence status including what kind of error has occurred when and in which device.

As a similar technique, a mechanism has been discussed for performing a failure diagnosis by analyzing details of a failure.

There is a system that notifies a service person (hereinbelow referred to as a user) of a failure occurrence status by an e-mail if a failure occurs in a device. Upon receiving the e-mail, the user can access the system using a Uniform Resource Locator (URL) described in the e-mail to check a repair procedure for resolving the failure.

According to Japanese Patent Application Laid-Open No. 2017-224133, a system is discussed that provides work procedures for resolving failures as well as information about light work, such as checking work and cleaning work, to be performed on a target device although such information is unrelated to the failure. The light work is defined as checking work of each function, cleaning work, and the like that a maintenance worker performs in a spare time after maintenance work.

When a management system presents a failure diagnosis result or the like to a user, there is a case where the management system wants to also provide maintenance information different from the above-described information about light work. The maintenance information described herein refers to information issued by a maintenance company or a manufacturing company as needed after a product is sold. The information is unrelated to the failure diagnosis result of the device in which an error has occurred, and is information to be made public regarding specific identification information at a timing of error occurrence.

According to the conventional technique, only the information about the light work defined in advance is provided together with the repair procedure for resolving a failure. The above-described maintenance information is unrelated to the repair procedure based on the failure diagnosis result, so that a user has to manually transition a screen to a dedicated checking screen for checking if necessary.

Thus, there can be an issue in the conventional technique that, in a case where sudden dispatch is requested or there are many repair procedures, maintenance information related to the specific identification information corresponding to an error or a device to be worked on may be overlooked. If the maintenance information is overlooked, there is a possibility that support, such as a maintenance visit, becomes necessary for the same device again.

SUMMARY

According to an aspect of the present disclosure, a system that provides information about a part for which action is to be taken in response to an error having occurred in an image processing apparatus, includes a management unit configured to manage maintenance information in association with at least one of specific identification information and an error identification (ID), an identification unit configured to, based on a predetermined error having occurred in the image processing apparatus, identify one or more parts, replacement of which can resolve the predetermined error, a transmission unit configured to transmit access information for providing information about the identified one or more parts, a reception unit configured to receive a request using the access information, and a provision unit configured to provide data for displaying the information about the identified one or more parts and the maintenance information together as a response to the request, wherein the maintenance information to be displayed based on the data includes maintenance information corresponding to an error ID of the predetermined error and maintenance information, included in the managed maintenance information, corresponding to the specific identification information of the image processing apparatus in which the predetermined error has occurred.

Further features of the present disclosure will become apparent from the following description of embodiments with reference to the attached drawings.

DESCRIPTION OF THE EMBODIMENTS

Exemplary embodiments for implementing the present disclosure will be described below with reference to the attached drawings.

<System Configuration>

Figure 1:
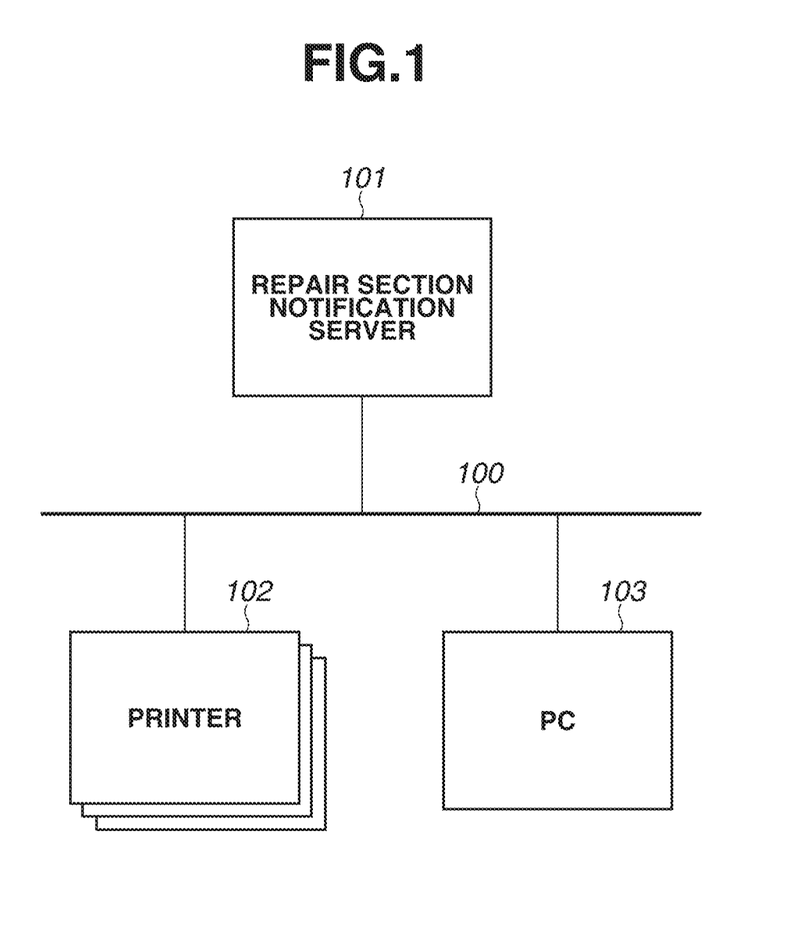
FIG. 1 illustrates an example of an overall configuration of a system according to an embodiment of the present disclosure.

FIG. 1 is a block diagram illustrating an example of an overall configuration of a system according to a first embodiment.

The system includes a repair section notification server 101, a printer 102, and a personal computer (PC) 103 that are configured to be communicable with each other via a network 100.

The network 100 is a communication network implemented by, for example, a local area network (LAN) such as the Internet, a wide area network (WAN), and a telephone line, and may be any network as long as data can be transmitted and received.

The repair section notification server 101 receives error information indicating an error that has occurred in the printer 102 from the printer 102 and estimates one or more pieces of information regarding a to-be-repaired part to resolve the error. Further, the repair section notification server 101 manages records of part replacements performed in the market for similar errors in the past as a market record, and uses the market record to determine priorities among to-be-repaired parts for which action is to be taken. Furthermore, the repair section notification server 101 transmits, to a user, an e-mail including a direct Uniform Resource Locator (URL) for directly accessing a repair procedure screen for resolving the error.

The repair section notification server 101 also manages maintenance information and a maintenance information display setting on whether to display the maintenance information, generates a repair procedure screen including the repair part information and the maintenance information in response to a repair procedure screen acquisition request from the user, and returns the repair procedure screen to a browser 331, which is described below. The maintenance information is issued as needed by a maintenance company or a manufacturer company after a product is sold and is managed by the repair section notification server 101. The maintenance information is unrelated to a failure diagnosis result of a device in which an error has occurred and is information to be made public regarding specific identification information at the timing of occurrence of the error. For example, the maintenance information includes information on how to deal with a transient problem that is issued depending on the specific identification information including at least one of a specific model and a specific model number (serial number). The maintenance information also includes information on a repair procedure for a transient problem that is issued depending on an error identification (ID) of a specific error. In addition to the repair procedure for a transient problem, the maintenance information includes information such as a defective part in a specific lot to be used in the specific model number and a work procedure for recommending version upgrade of firmware for the specific model that does not immediately cause a problem but can cause an error.

Figure 2A:
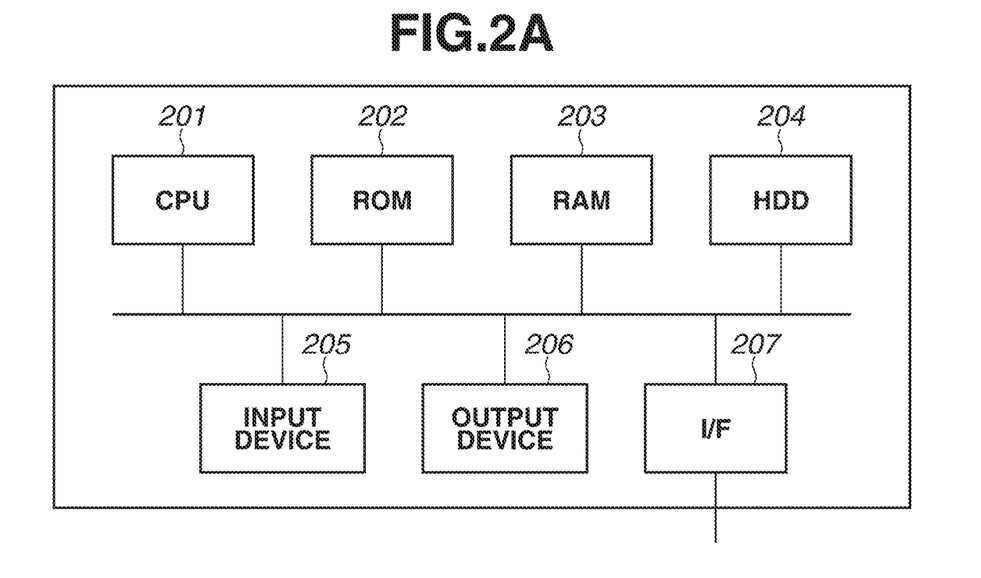
FIGS. 2A and 2B each illustrate an example of a hardware configuration.

A function of the repair section notification server 101 according to the present embodiment of the present disclosure described below may be implemented by a single server or a single virtual server, or may be implemented as a repair section notification system by a plurality of servers or a plurality of virtual servers. Alternatively, a plurality of virtual servers may be executed in a single server. In this case, the repair section notification server 101 is included as one server function in the repair section notification system constructed on the Internet. The repair section notification system may be designed on a cloud platform based on a cloud computing technology. In this case, at least a part of hardware included in a computer illustrated in FIG. 2A is used as a hardware resource provided to a virtual server using the cloud computing technology.

The printer 102 is an example of an image processing apparatus to which the present embodiment of the present disclosure can be applied. The image processing apparatus includes not only a printer but also a copying machine and a multifunction peripheral. For example, a multifunction peripheral has a plurality of functions, such as a printing function, a scanning function, a copying function, and a transmission function. If the printer 102 detects occurrence of an error in itself, the printer 102 transmits error information including device information that enables identifying the printer 102 to the repair section notification server 101. The system may be configured to include a plurality of printers 102. In this case, the repair section notification server 101 can execute processing described below on a plurality of image processing apparatuses.

The PC 103 is an example of an information processing apparatus and is installed with a predetermined operation system (OS) (not illustrated). The PC 103 is also installed with the browser 331, which is described below. A repair screen acquisition request of the printer 102 is transmitted to the repair section notification server 101 via the browser 331, and a repair screen is received from the repair section notification server 101 and is displayed on a graphical user interface (GUI).

<Hardware Configuration>

FIG. 2A is a block diagram illustrating a hardware configuration of the repair section notification server 101 and the PC 103. In FIG. 2A, a central processing unit (CPU) 201 directly or indirectly controls devices (a read-only memory (ROM), a random access memory (RAM), and the like, which are described below) connected by an internal bus and executes a program for realizing the present embodiment of the present disclosure.

A ROM 202 stores a Basic Input/Output System (BIOS). A RAM (a direct storage device) 203 is used as a work area for the CPU 201 and as a temporary storage for loading a software module to realize the present embodiment of the present disclosure. A hard disk drive (HDD) 204 stores the OS, which is basic software, and a software module. Alternatively, an indirect storage device such as a solid state drive (SSD) may be used as the HDD 204. An input device 205 is a keyboard, a pointing device, and the like (not illustrated). An output device 206 is connected to a display. An interface (I/F) 207 is used to connect the repair section notification server 101 or the PC 103 to the network 100.

In the above-described hardware, after startup, the BIOS is executed by the CPU 201, and the OS is loaded from the HDD 204 into the RAM 203 in an executable manner. The CPU 201 loads various software modules described below from the HDD 204 into the RAM 203 in an executable manner as needed in accordance with operation of the OS. The various software modules are executed and operated by the CPU 201 in cooperation with the above-described devices. The I/F 207 is controlled by the CPU 201 in accordance with the operation of the OS and connected to the Internet or a local network to implement communication as a communication unit.

Figure 2B:
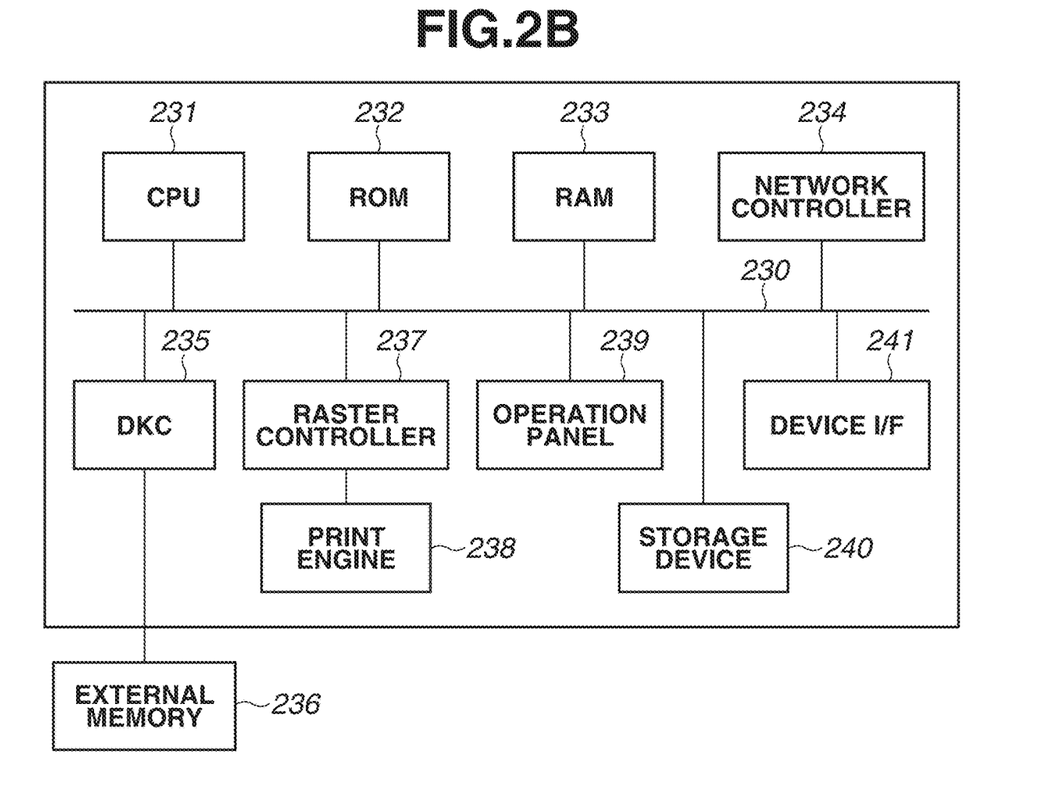

FIG. 2B is a block diagram illustrating a hardware configuration of the printer 102. A part of the hardware configuration excluding a print engine 238 is also referred to as a controller that controls a control system of the printer 102. Each hardware component is connected to a system bus 230.

A CPU 231 controls the entire apparatus and comprehensively controls access to various devices connected to the system bus 230. The control is based on a control program and the like stored in a ROM 232 or a control program, resource data (resource information), and the like stored in an external memory 236 connected via a disk controller (DKC) 235. A RAM 233 functions as a main memory, a work area, and the like of the CPU 231 and is configured to be able to expand a memory capacity using an option RAM to be connected to an expansion port (not illustrated). A storage device 240 is an external storage device that functions as a large capacity memory. An operation panel (operation unit) 239 displays a screen and receives an operation instruction from a user via the screen. A button and a display unit, such as a liquid crystal panel, are also arranged on the operation panel 239 to perform operations, such as setting an operation mode or the like of the printer 102, displaying an operation status of the printer 102, and specifying content data to be printed. A network controller 234 is, for example, a network interface card (NIC) and, data is exchanged with an external apparatus via the network controller 234. A raster controller 237 is a controller that converts print data described in, for example, a page description language (PDL) into image data. The print engine 238 uses a known printing technique to form an image on a sheet based on image data input from the raster controller 237. A desirable implementation system includes, for example, a print engine using an electrophotographic method (laser beam method), an inkjet method, and a sublimation (thermal transfer) method. A device I/F 241 is a connection I/F for connecting with an external device connectable using a universal serial bus (USB) or the like.

<Software Configuration>

Figure 3:
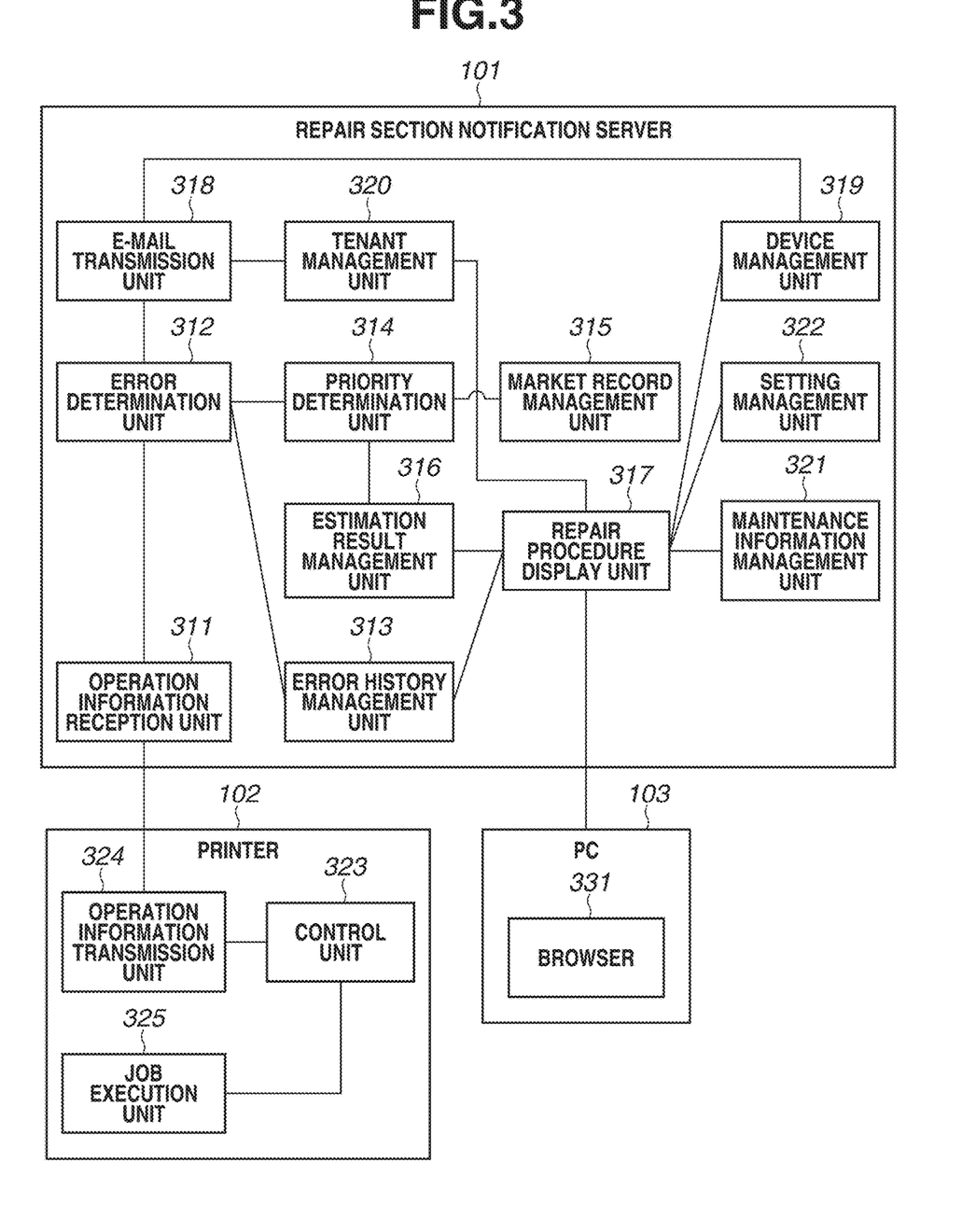
FIG. 3 illustrates an example of a software configuration.

Processing implemented by software of each apparatus included in the system is described with reference to FIG. 3. Blocks illustrated in FIG. 3 are examples of modules that are implemented by executing software. Specifically, the modules are implemented by the CPU executing software (program) stored in a memory of each apparatus. A schema and data in a table described below are just examples, and the schema and a format of various data in the table are not limited thereto.

First, a configuration of the repair section notification server 101 is described. An operation information reception unit 311 receives operation information from the printer 102. The operation information that the operation information reception unit 311 receives together with identification information of the printer 102 includes error information indicating an error and log information of the printer 102. The operation information also includes a total number of pages printed by the printer 102 and counter information of a part counter that indicates a level of consumption of a part.

Upon receiving the error information from the operation information reception unit 311, an error determination unit 312 acquires an error history that is information about errors that have occurred in the past in the printer 102, which is a printer in which an error has occurred, from an error history management unit 313. Further, the error determination unit 312 identifies one or more to-be-repaired parts to resolve the error and transmits information about the to-be-repaired parts as a determination result together with the received error information to a priority determination unit 314, which is described below. At this time, if the error determination unit 312 is unable to identify the to-be-repaired part for some reason, such as in a case where an error is unable to be identified for a certain error code, the error determination unit 312 transmits the determination result indicating that "the to-be-repaired part is not identified" together with the error information to the priority determination unit 314, which is described below. Further, the error determination unit 312 stores the error information received from the printer 102 as the error history in the error history management unit 313.

Further, the error determination unit 312 transmits error information including a device ID for identifying a device and an error code to an e-mail transmission unit 318, which is described below, to transmit, to the user, the e-mail including a URL for accessing the repair procedure screen.

The error history management unit 313 stores and manages the error information received from the printer 102 as the error history. Table A represents an example of a part of the error history managed by the error history management unit 313.

TABLE A

| Error ID | Device ID | Model Number | Error Code | Counter Value | Date and Time of Occurrence |
|---|---|---|---|---|---|
| Err-001 | DEV0000001 | Model-001 | E001-0001 | 5000 | 2022 Oct. 1 T12:34:56Z |
| Err-002 | DEV0000002 | Model-002 | E002-0002 | 1500 | 2022 Sep. 3 T00:00:00Z |
| Err-003 | DEV0000001 | Model-001 | E003-0001 | 2000 | 2022 Sep. 1 T00:12:34Z |

The error history includes an error ID uniquely identifying the error, a device ID uniquely identifying the printer in which the error has occurred, a model number representing the model, an error code representing a type of error that has occurred, a counter value representing the number of prints when the error has occurred, and date and time when the error has occurred.

Upon receiving the determination result from the error determination unit 312, the priority determination unit 314 acquires information about a market record having the model number and the error code matching those of the error information included in the determination result from the market record accumulated and managed by a market record management unit 315. The priority determination unit 314 further specifies, from the acquired information, information about a market record that has part numbers matching those of the to-be-repaired parts included in the determination result and ranks the to-be-repaired parts in descending order of the number of times of part replacement based on the specified information as "the to-be-repaired part with a high probability of resolving the error". And the priority determination unit 314 stores repair procedures for the ranked to-be-repaired parts in an estimation result management unit 316 as estimation results.

The market record management unit 315 compiles and records information, for each type of action taken by a service person to resolve an error that has occurred in the past, in association with the model number of the image processing apparatus, the error code, and the part number and manages the recorded information as the market record.

Table B represents an example of the market record managed by the market record management unit 315 regarding part replacement performed by a service person.

TABLE B

| Model Number | Error Code | Part Number | Number of Times of Replacement |
|---|---|---|---|
| Model-001 | E001-0001 | Part1-111 | 510 |
| Model-001 | E001-0001 | Part2-222 | 228 |
| Model-001 | E001-0001 | Part3-333 | 92 |
| Model-001 | E001-0001 | Part4-444 | 20 |
| Model-001 | E001-0001 | Part5-555 | 150 |
| Model-002 | E001-0001 | Part1-111 | 123 |
| Model-001 | E002-0002 | Part5-555 | 2000 |

A market record includes the model number representing the model, the error code representing the type of error that has occurred, the part number representing the part replaced in resolving the error, and the number of times of replacement representing the number of times the part is actually replaced.

The estimation result management unit 316 stores and manages the estimation results that are the repair procedures for the ranked to-be-repaired parts generated by the priority determination unit 314. Table C represents an example of a part of the estimation results managed by the estimation result management unit 316.

TABLE C

| Device ID | Error ID | Part Number | Priority |
|---|---|---|---|
| DEV0000001 | Err-001 | Part1-111 | 51.0 |
| DEV0000001 | Err-001 | Part2-222 | 22.8 |
| DEV0000001 | Err-001 | Part3-333 | 9.2 |
| DEV0000001 | Err-001 | Part4-444 | 2.0 |
| DEV0000002 | Err-002 | Part1-111 | 100.0 |

Each estimation result includes the device ID, the error ID, the part number of the to-be-repaired part to resolve the error, and a priority indicating the order of the part to be repaired. According to the present embodiment, a repair priority is higher as the value of the priority is larger. An example of a method of calculating the priority is described below with reference to repair part estimation processing in FIG. 4.

A repair procedure display unit 317 provides data, such as HyperText Markup Language (HTML) data, for a screen to be displayed on the browser 331 in response to receiving a repair procedure acquisition request including the device ID and the error ID from the browser 331 of the PC 103.

In providing the data, the repair procedure display unit 317 acquires, from the error history management unit 313, an error history having the device ID and the error ID matching the requested ones. The repair procedure display unit 317 also acquires, from the estimation result management unit 316, an estimation result having the device ID and the error ID matching the requested ones. The repair procedure display unit 317 also acquires, from a device management unit 319, a tenant ID and a model ID of device information having the device ID matching the requested one and acquires, from a maintenance information management unit 321, the maintenance information having the model ID and the error ID matching the requested ones. At this time, in a case where the above-described acquisition request includes information indicating direct display, the repair procedure display unit 317 acquires the maintenance information in which only the model ID matches the requested one.

The repair procedure display unit 317 further acquires, from a setting management unit 322, the maintenance information display setting having a tenant ID and a maintenance information ID respectively matching the acquired tenant ID and the maintenance information ID included in the maintenance information. Then, the repair procedure display unit 317 determines whether to include the maintenance information in the repair procedure screen depending on contents of the maintenance information display setting.

If the error information including the device ID for identifying the device and the error code is received from the error determination unit 312, the e-mail transmission unit 318 generates a direct URL for accessing the repair procedure screen to resolve an error in the received error information. Then, the e-mail transmission unit 318 acquires, from the device management unit 319, which is described below, the tenant ID of the device information having the matching device ID. The e-mail transmission unit 318 further acquires an e-mail address of tenant information having the tenant ID that matches the acquired tenant ID from a tenant management unit 320, which is described below, and transmits an e-mail including the generated direct URL.

The device management unit 319 manages and stores the device information that is management information about the device, which is the printer 102, managed by the repair section notification server 101. Table D represents an example of a part of the device information managed by the device management unit 319.

TABLE D

| Device ID | Tenant ID | Model Number |
|---|---|---|
| DEV0000001 | TENANT_A | Model-001 |
| DEV0000002 | TENANT_A | Model-002 |
| DEV0000003 | TENANT_B | Model-001 |
| DEV0000004 | TENANT_C | Model-003 |

The device information includes the device ID uniquely representing the device, the tenant ID indicating an organization to which the device belongs, and the model number representing the model.

The tenant management unit 320 stores and manages the tenant information indicating the organization to which the device belongs. Table E represents an example of a part of the tenant information managed by the tenant management unit 320.

TABLE E

| Tenant ID | Parent Tenant ID | Region | E-mail Address |
|---|---|---|---|
| TENANT_A | — | JP | user-a@example.com |
| TENANT_B | TENANT_A | JP | admin@company.co.jp |
| TENANT_C | TENANT_A | JP | xyz@abc.com |
| TENANT_D | — | US | user-d@dddd.com |

A tenant representing an organization has a hierarchical structure and can own one or more lower tenants. The tenants have a tree structure of independent tenants for each region, and the tenant can operate a disclosure setting and a display setting of the maintenance information, which is described below, of the lower tenant(s). Accordingly, an upper tenant can control a lower tenant with regard to whether to set the maintenance information to displayable. The tenant information includes the tenant ID uniquely identifying the tenant, a parent tenant ID representing the upper tenant of the tenant, a region where the tenant exists, and an e-mail address that is an e-mail transmission destination in a case where an error occurs in the device belonging to the tenant. An e-mail address at which an operator in charge of maintaining the device can check e-mails is registered as the e-mail transmission destination.

In a case of an uppermost tenant, there is no parent tenant, so that the parent tenant ID includes no value or a fixed character string, such as "-" indicating that no value exists.

The maintenance information management unit 321 manages the maintenance information with respect to specific identification information about the device, the error, and the like issued at that time. Table F represents an example of a part of the maintenance information managed by the maintenance information management unit 321.

TABLE F

| Maintenance Information ID | Region | Model Number | Error Code | Title | Maintenance Information URL |
|---|---|---|---|---|---|
| SI035-0220-10 | JP, US | Model-001 | — | Regarding Failure in XXX | https://xxx.xxx/001 |
| SI040-0330-20 | JP, US | Model-001 | E001-0001 | Regarding Error in E001-0001 | https://xxx.xxx/002 |
| SI050-0110-00 | JP | Model-002 | — | Firmware Update | https://xxx.xxx/003 |

The maintenance information includes the maintenance information ID uniquely identifying the maintenance information, a region indicating a region in which the information is published, a model number of a target model of the maintenance information, an error code that is a target error code, a title indicating contents of the maintenance information, and a maintenance information URL indicating a location of the contents of the maintenance information. Maintenance information that is not related to an error is managed without information in an error code column ("-"). Further, the maintenance information can be managed using the model number (serial number) and the like.

The setting management unit 322 manages setting information to determine whether to display the maintenance information on the repair procedure screen for each tenant. Table G represents an example of a part of the setting information managed by the setting management unit 322.

TABLE G

| Tenant ID | Maintenance Information ID | Disclosure Setting | Display Setting |
|---|---|---|---|
| TENANT_A | SI035-0220-10 | Public | Display |
| TENANT_A | SI040-0330-20 | Public | Display |
| TENANT_A | SI050-0110-00 | Private | Display |
| TENANT_B | SI035-0220-10 | Public | Hidden |
| TENANT_B | SI040-0330-20 | Public | Display |
| TENANT_B | SI050-0110-00 | Public | Hidden |
| TENANT_C | SI035-0220-10 | Private | Hidden |
| TENANT_C | SI040-0330-20 | Private | Hidden |
| TENANT_C | SI050-0110-00 | Private | Hidden |
| TENANT_D | SI035-0220-10 | Public | Hidden |
| TENANT_D | SI040-0330-20 | Public | Display |

The setting information includes the tenant ID of the tenant as a setting target, the maintenance information ID of the maintenance information of the setting target, a disclosure setting of whether to disclose the maintenance information to the target tenant, and a display setting of whether to display the maintenance information on the repair procedure screen.

The disclosure setting is a setting that can be set by the upper tenant on the lower tenant based on the above-described tenant information, and the maintenance information with the disclosure setting set to "private" is not displayed on the repair procedure screen. The display setting is an item for determining whether to display the maintenance information with respect to the setting information for which the disclosure setting is set to "public". In other words, only the maintenance information for which the disclosure setting is set to "public" and the display setting is set to "display" is displayed on the repair procedure screen.

For example, in Table G, in a case where an error occurs in the device of the tenant ID "TENANT_A", the maintenance information IDs of the maintenance information that can be displayed on the repair procedure screen are "SI035-0220-10" and "SI040-0330-20".

Next, a configuration of the printer 102 is described. The printer 102 includes an operation information transmission unit 324, a job execution unit 325, and a control unit 323.

The operation information transmission unit 324 transmits information about the error that has occurred in the printer 102 collected by the control unit 323, which is described below, to the repair section notification server 101. The job execution unit 325 executes a job input to the printer 102. For example, in a case where a print job is input, the job execution unit 325 executes printing processing based on the print job. The control unit 323 detects an error that has occurred in the printer 102, collects the error information, and transmits the error information to the repair section notification server 101 via the operation information transmission unit 324.

<To-be-Repaired Part Estimation Processing>

Figure 4:
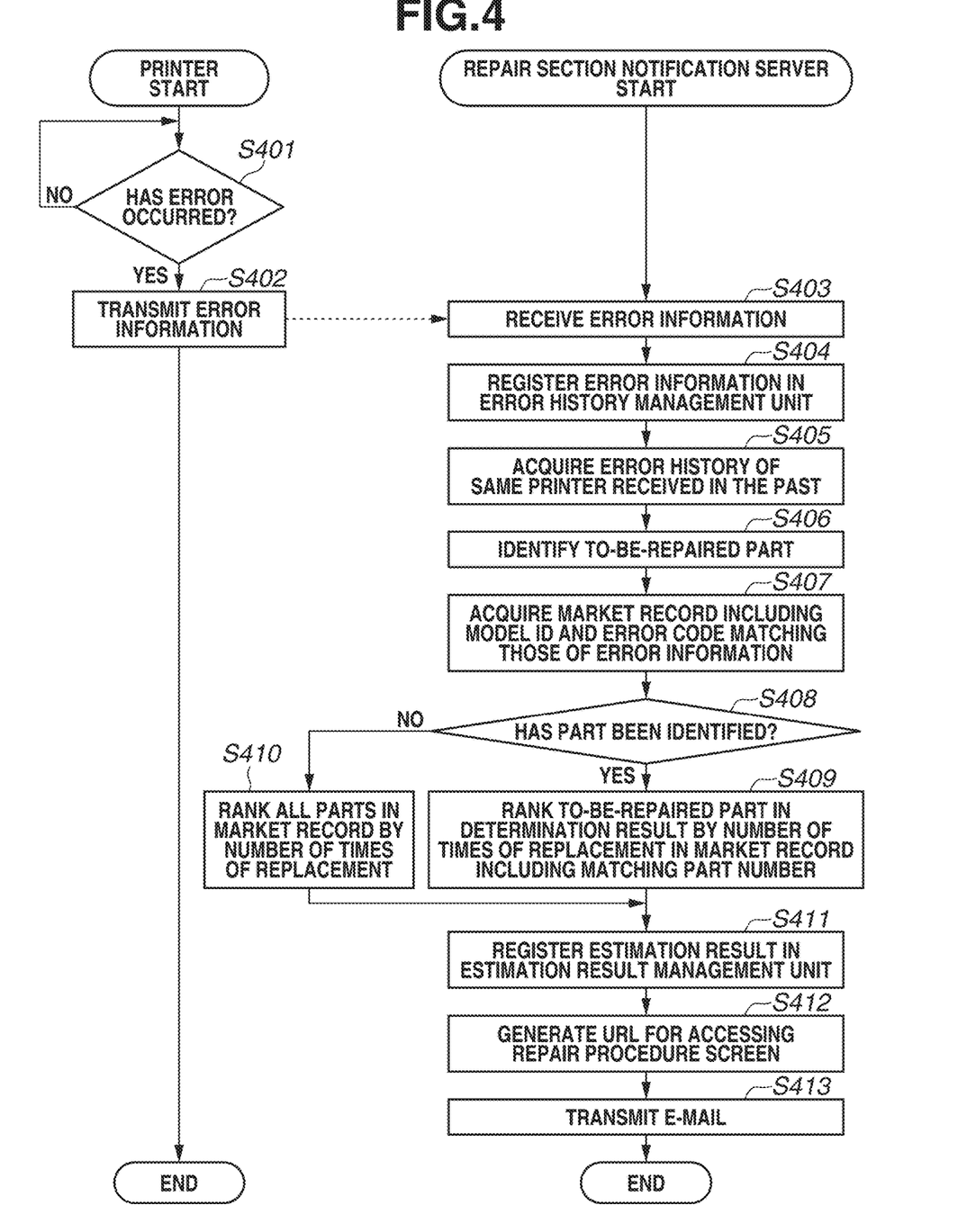
FIG. 4 is a flowchart illustrating to-be-repaired part estimation processing executed by a repair section notification server.

FIG. 4 is a flowchart illustrating to-be-repaired part estimation processing executed by the repair section notification server 101 with respect to an error that has occurred in the printer 102 in the system.

In step S401, the control unit 323 in the printer 102 detects whether an error has occurred in the printer 102. If an occurrence of an error is detected (YES in step S401), in step S402, the operation information transmission unit 324 transmits the error information to the repair section notification server 101.

Processing in steps S403 to S413 is performed in the repair section notification server 101.

In step S403, the operation information reception unit 311 receives the error information from the printer 102. The error information includes information managed in the error history in Table A, such as the error ID, the device ID, the model number, the error code, the counter value, and the date and time of occurrence of the error.

According to the present embodiment, an example is described in which the counter value is included in the error information, but, for example, a method may be used in which the counter value is received as counter information from the printer 102 as information different from the error information and the counter information is associated with the error information.

In step S404, the error determination unit 312 registers the received error information as the error history in the error history management unit 313. In step S405, the error determination unit 312 acquires the error history having the device ID matching the one included in the error information received in step S403. For example, in a case where the device ID included in the error information is "DEV0000001", the records in first and third rows are acquired from Table A described above.

In step S406, the error determination unit 312 identifies one or more pieces of part information (the part number and the like) representing the to-be-repaired part for which action is to be taken to resolve the error based on a rule-based method using the error information received from the printer 102 and the error history acquired from the error history management unit 313.

In step S406, the error determination unit 312 may not be able to identify the to-be-repaired part for which action is to be taken in some cases. For example, there is a case of an error without a rule in the rule-based method. At this time, the error determination unit 312 outputs part information indicating that determination is not made (a part information list with empty content).

In the present embodiment, the error determination unit 312 identifies a part for which action is to be taken using a rule-based method based on the received error information and the history of the error that has occurred in the device in the past, and outputs a determination result. However, the determination result may be output using a learned model trained by supervised machine learning including deep learning and substituting estimation processing using the error information received in step S403 as an input for the above described method.

In step S407, the priority determination unit 314 acquires record information having the model number and the error code matching those of the error information received in step S403 and the type of action taken that is replacement, from the market record managed by the market record management unit 315. For example, in a case where the model number and the error code included in the error information are respectively "Model-001" and "E001-0001", a plurality of records from first to fifth rows in Table B are acquired.

In step S408, the priority determination unit 314 checks whether the error determination unit 312 has identified the to-be-repaired part. Specifically, in the case where the part information list with empty content is output in step S406, it is determined that the part has not been identified (NO in step S408), and the processing in step S410, which is described below, is executed. In a case where it is determined that the part has been identified (YES in step S408), the processing in step S409, which is described below, is executed.

In step S409, the priority determination unit 314 acquires the number of times of replacement of the to-be-repaired part having the part number matching that in the market record acquired in step S407 for each of the part numbers included in the part information identified in step S406. In step S409, the priority determination unit 314 then associates the priority with the part number as "(the number of times of replacement of the to-be-repaired part/the total number of times of replacement of all parts replaced in resolving the errors)*100". In other words, the priority is calculated for each part so that the sum of priorities of all replaced parts is 100% for an error code that has occurred in a certain model.

In the present embodiment, the priority is calculated as a percentage of the number of times of replacement of the to-be-repaired part with respect to the total number of times of replacement of all to-be-repaired parts for which action is to be taken, but the calculation method of the priority is not limited to the method according to the present embodiment, and any method may be used.

For example, in a case where a list of the part numbers includes [Part1-111, Part2-222, Part3-333, and Part4-444] and the market record acquired in step S407 is the first to fifth rows in Table B, the total number of times of replacement of all replaced parts is 1000, which is the sum of the number of times of replacement in the market record.

At this time, the priority of the part number "Part1-111" is "(510/1000)*100=51.0". Similarly, the priorities of other part numbers "Part2-222", "Part3-333", and "Part4-444" are respectively "22.8", "9.2", and "2.0".

In step S410, the priority determination unit 314 calculates the priorities for all the records in the market record acquired in step S407 using the same method as that in step S409 described above. For example, in a case where the market record acquired in step S407 includes the first to fifth rows in Table B is described. At this time, the priorities are calculated for five part numbers "Part1-111", "Part2-222", "Part3-333", "Part4-444", and "Part5-555" included in the market record and are associated with the part numbers as the estimation results. A specific example of the priority is omitted here.

In step S411, the priority determination unit 314 registers the part number and the priority calculated in step S409 or S410 together with the device ID and the error ID of the error information in the estimation result management unit 316 as the estimation result.

For example, examples of the estimation result for the part numbers and the priorities calculated in the example in step S409 are first to fourth rows in Table C.

In step S412, the error determination unit 312 transmits the error information including the device ID and the error code to the e-mail transmission unit 318. Upon receiving the error information, the e-mail transmission unit 318 generates access information (the direct URL) for directly accessing the repair procedure screen to resolve the error. The URL is given a parameter with which the URL can be identified as the direct URL. For example, a parameter such as "isDirect=true" is set as a part of a query string, such as "https://abc.com/DEV0000001/Err-01?isDirect=true".

In step S413, the e-mail transmission unit 318 acquires, from the device management unit 319, the tenant ID of the device information having the device ID matching the device ID included in the error information. Further, the e-mail transmission unit 318 acquires, from the tenant management unit 320, the e-mail address in the tenant information having the matching tenant ID and transmits an e-mail including the direct URL generated in step S412 in a body to the e-mail address.

Through the above-described processing, it is possible to estimate the to-be-repaired part and transmit an e-mail notification including the direct URL with respect to the error that has occurred in the printer 102.

As an example of a method for implementing the above-described processing, a server (function) can execute the processing in steps S403 to S411 of the repair section notification server 101 and another server (function) can execute the processing in steps S412 to S413 of the repair section notification server 101, separately, and the servers can implement the processing asynchronously.

<Generation Processing for Repair Procedure Screen>

Figure 5:
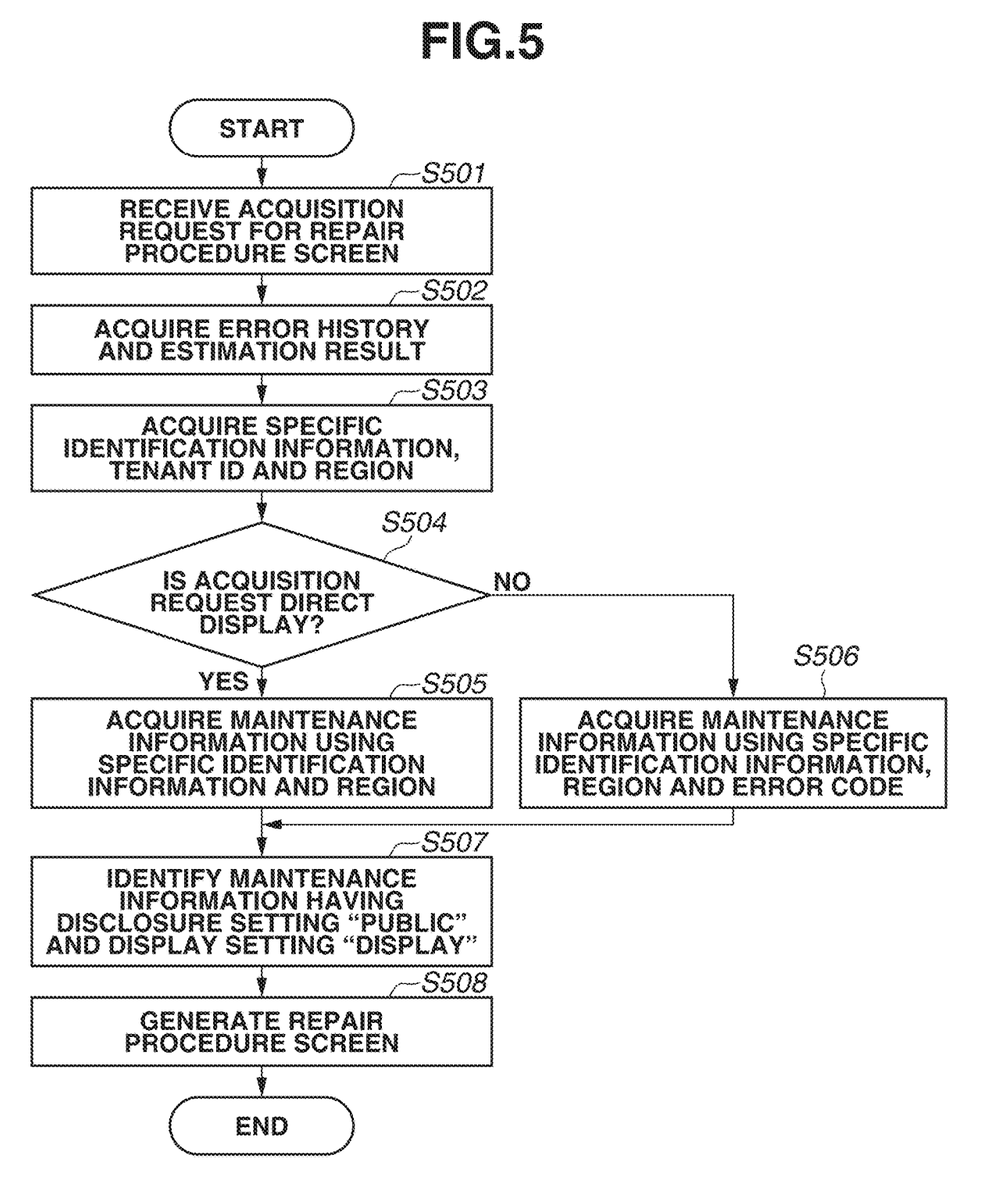
FIG. 5 is a flowchart illustrating generation processing for a repair procedure screen executed by the repair section notification server.

FIG. 5 is a flowchart illustrating generation processing for the repair procedure screen executed by the repair section notification server 101.

In step S501, the repair procedure display unit 317 receives an acquisition request for the repair procedure screen including the device ID and the error ID using the direct URL from the browser 331 of the PC 103. The request occurs if the browser 331 executes access using URL information, such as "https://abc.com/DEV0000001/Err-01?isDirect=true" generated in step S412.

In step S502, the repair procedure display unit 317 acquires the error history having the error ID matching the error ID of the received acquisition request from the error history management unit 313 and acquires the estimation result having the error ID matching the error ID of the acquisition request from the estimation result management unit 316.

In step S503, the repair procedure display unit 317 acquires the specific identification information corresponding to the device ID of the received acquisition request. Specifically, the repair procedure display unit 317 acquires the device information having the matching device ID from the device management unit 319. Then, the repair procedure display unit 317 acquires the specific identification information, such as the model number, and the tenant ID from the device information. The repair procedure display unit 317 further acquires information about the region corresponding to the acquired tenant ID from the tenant management unit 320.

In step S504, the repair procedure display unit 317 determines whether the acquisition request is an acquisition request using the direct display using the direct URL. Specifically, the determination is made based on whether "isDirect=true" exists in the query string included in the URL. In a case where it is determined that the acquisition request is the acquisition request using the direct display (YES in step S504), the processing in step S505 is executed, and in a case where it is determined that the acquisition request is not the acquisition request using the direct display (NO in step S504), the processing in step S506 is executed.

In step S505, the repair procedure display unit 317 acquires the maintenance information having the specific identification information, such as the model number, and the region matching those acquired in step S503 from among pieces of maintenance information managed by the maintenance information management unit 321. For example, in a case where the model number is "Model-001" and the region is "US", the maintenance information represented by two records in the first and second rows in the above-described Table F is acquired. Alternatively, the maintenance information may be acquired using only the specific identification information without using the region.

In step S506, the repair procedure display unit 317 acquires the maintenance information having the specific identification information and the region matching those acquired in step S503 and the error code matching the error code included in the error history acquired in step S502 from the maintenance information managed by the maintenance information management unit 321. For example, in a case where the model number is "Model-001", the error code is "E001-0001", and the region is "JP", only the maintenance information represented by the record in the first row is acquired in the above-described Table F.

In step S507, the repair procedure display unit 317 checks the setting in the above-described Table G, which is managed by the setting management unit 322, for the maintenance information acquired in step S505 or S506. Specifically, the repair procedure display unit 317 checks whether the disclosure setting and the display setting of the maintenance information ID of the maintenance information are respectively "public" and "display" for the record having the tenant ID matching the tenant ID acquired in step S503. The repair procedure display unit 317 performs the check and thus identifies the maintenance information corresponding to the maintenance information ID having the disclosure setting set to "public" and the display setting set to "display". The maintenance information identified here is a display target on the repair procedure screen.

For example, a case is described where the tenant ID acquired in step S503 is "TENANT_A", the maintenance information ID of the maintenance information acquired in step S505 or S506 is "SI035-0220-10" and "SI050-0110-00". In this case, only "SI035-0220-10" is the maintenance information of the display target as a result of referring to the above-described Table G.

In step S508, the repair procedure display unit 317 generates data, such as HTML data, for displaying the repair procedure screen that provides information about the error history acquired in step S502, the estimation result, and the maintenance information identified as the display target in step S507, and returns the data to the browser 331.

Figure 6:
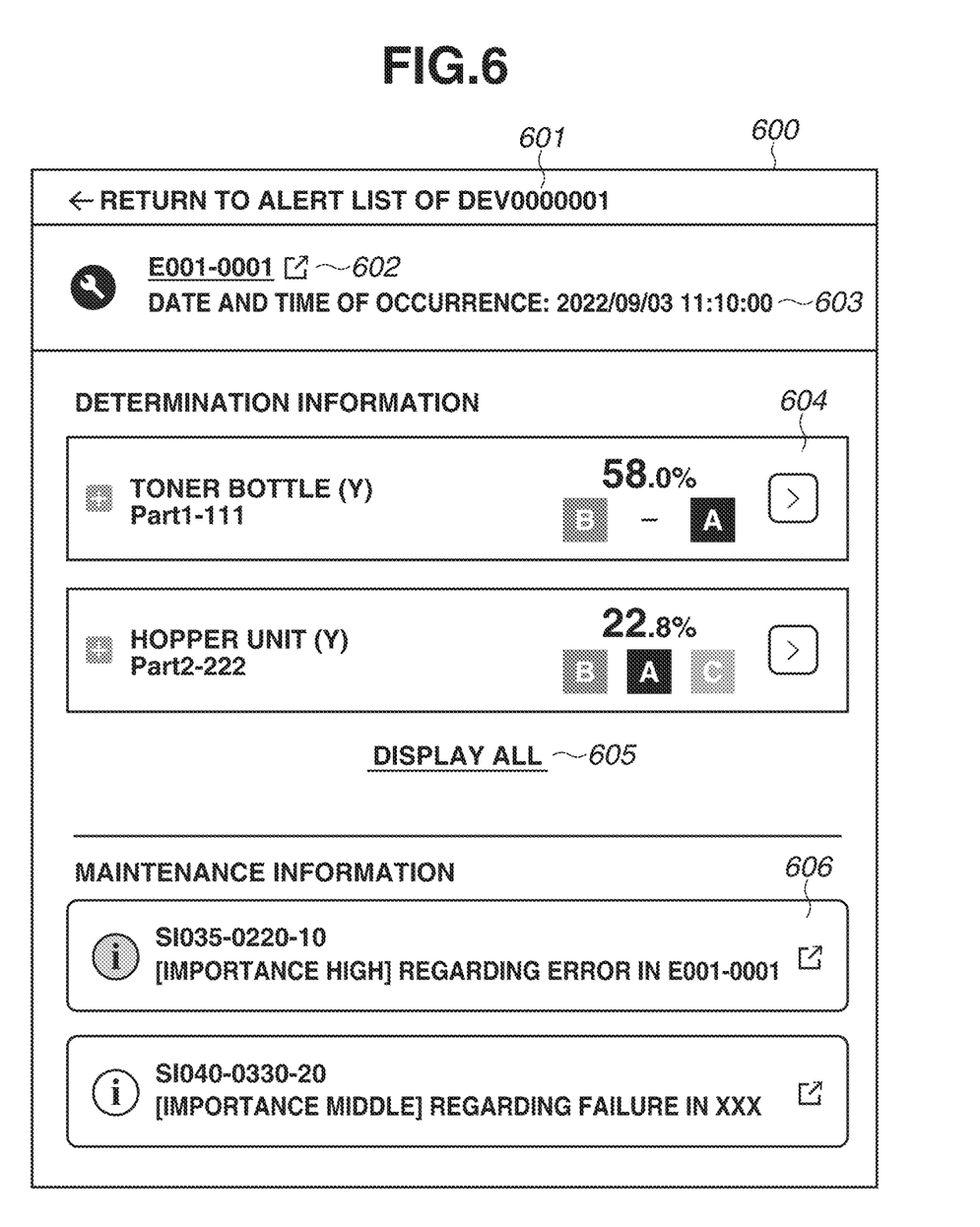
FIG. 6 illustrates an example of the repair procedure screen provided by the repair section notification server.

FIG. 6 illustrates an example of the repair procedure screen to be displayed by the browser 331 based on the data returned in step S508.

The repair section notification system including the repair section notification server 101 is a system that displays the repair procedure for resolving an error for each error that occurs. A repair procedure display screen 600 includes the repair procedure for the error specified by the browser 331 and a maintenance procedure for the error and the model in which the error has occurred.

The repair procedure display screen 600 displays the error history, the estimation result, and the maintenance procedure managed by the repair section notification server 101.

A device ID 601 is identification information regarding the device that is a target of the acquisition request. An error code 602 is a code that indicates the error ID that is the target of the acquisition request. Date and time of occurrence 603 displays the date and time of occurrence to be recorded in the record managed as the error history in the error history management unit 313 with regard to the error ID that is the target.

In a to-be-repaired part 604, the estimation result having the error ID matching the error ID of the target of the acquisition request is displayed among the estimation results managed by the estimation result management unit 316. The repair procedure display unit 317 displays the estimation results in the to-be-repaired part 604 in descending order of the priority of the estimation results acquired through the processing described with reference to FIG. 4, and thus can present, to a user, which part is to be repaired first. In the present embodiment, the to-be-repaired part with low priority is not initially displayed and is displayed by the user clicking a link 605. Alternatively, all of the to-be-repaired parts may be displayed by default.

In maintenance information 606, the maintenance information identified in step S507 in FIG. 5 is displayed. Regarding the maintenance information to be displayed in the maintenance information 606, in the case of the acquisition request using the direct URL, the maintenance information having the model number matching the model number of the model of the device ID specified in the request is displayed.

On the other hand, the maintenance information to be displayed in the maintenance information 606 in the case of the acquisition request not using the direct URL is the maintenance information having the model number matching the model number of the model of the device ID specified in the request and the error code matching the error code corresponding to the error ID.

In the present embodiment, the maintenance information to be displayed is determined based on whether the direct URL that is included in the repair procedure screen acquisition request includes a query string indicating the direct display (in step S504), but the present embodiment is not limited to this. It may be determined whether the browser 331 is a browser of a mobile device based on User-Agent at the time of receiving the repair procedure screen acquisition request, and the maintenance information to be displayed may be switched accordingly.

As an example of a method for implementing the present embodiment, a server (function) can execute the processing in steps S403 to S413 of the repair section notification server 101 and another server (function) can execute the processing in steps S501 to S508 of the repair section notification server 101, separately, and the servers can be constructed in the repair section notification system. Further, with this configuration, it is possible to implement the processing executed by each server asynchronously.

According to the first embodiment, in a case where the direct URL includes the query string indicating the direct display, the repair procedure display unit 317 also displays the maintenance information including not only the matching error code but also the matching model number on the repair procedure screen.

At this time, since the maintenance information that is not related to error resolution is displayed on the repair procedure screen, there is a possibility that work for the maintenance information not related to the error resolution is performed first and the error resolution that is originally intended is delayed. Particularly, in a case where work required at a location where the printer 102 is installed is checked from a mobile terminal, a customer requests to resolve the error immediately, so it is desirable to prioritize the work required to resolve the error.

In a second embodiment, an example is described where a screen that enables a user to determine that a work priority of maintenance information directly related to error resolution is high is displayed while maintenance information that is not related to the error resolution is also displayed on a repair procedure screen. Descriptions of parts similar to those in the first embodiment are omitted.

Figure 7:
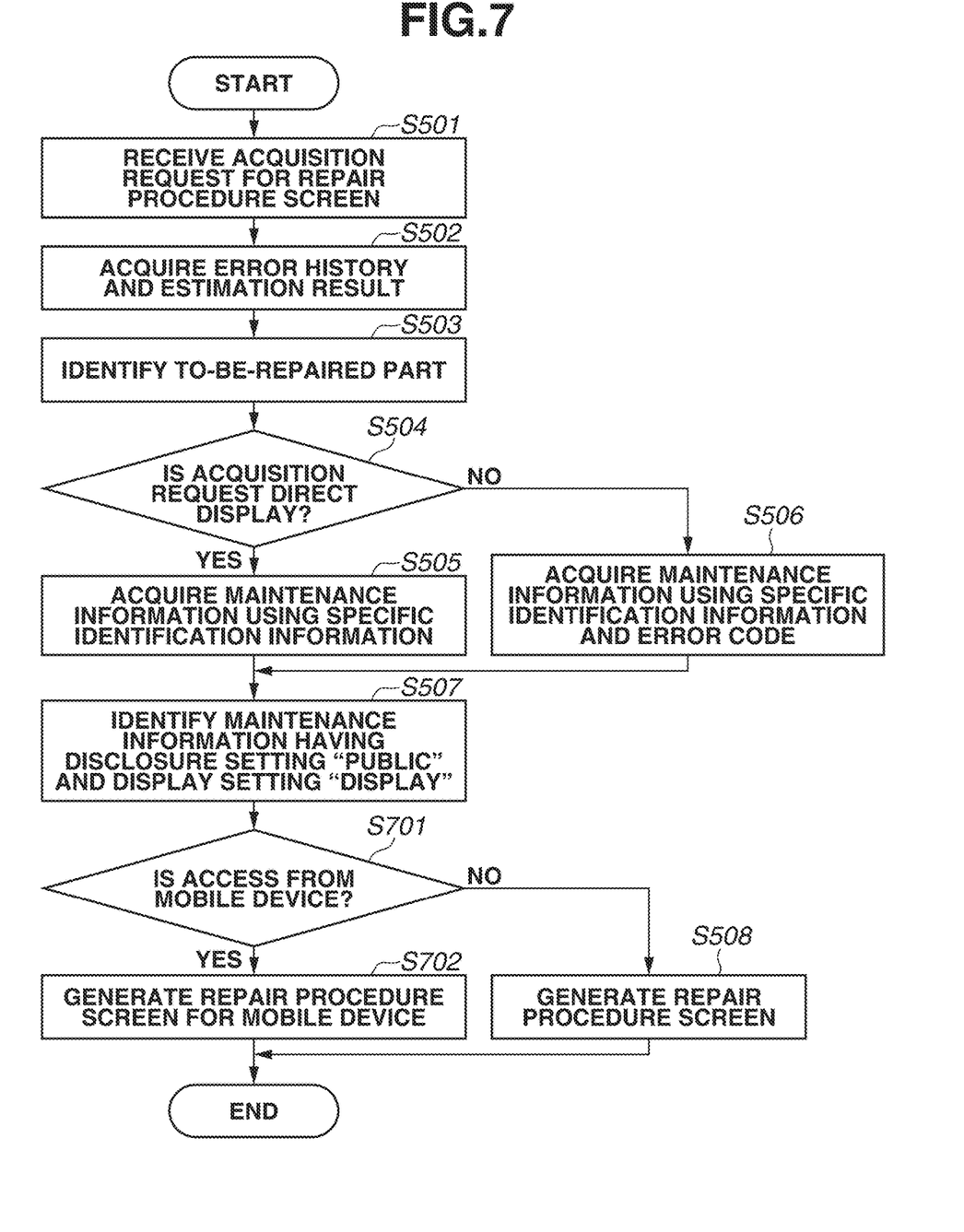
FIG. 7 is a flowchart illustrating generation processing for a repair procedure screen according to a second embodiment.

FIG. 7 is a flowchart illustrating generation processing for the repair procedure screen by the repair section notification server 101 according to the present embodiment. Processes similar to those described with reference to FIG. 5 are denoted by the same reference numerals (steps S501 to S508), and descriptions thereof are omitted here.

In step S701, the repair procedure display unit 317 checks a User-Agent value in request data at the time of receiving the acquisition request. Here, the repair procedure display unit 317 can check whether the PC 103 in which the browser 331 operates is a mobile device from the User-Agent value. In a case where access is made from the browser 331 operating on the mobile device (YES in step S701), the processing in step S702 is executed, and otherwise (NO in step S701), the processing in step S508 is executed.

In step S702, the repair procedure display unit 317 executes generation of the repair procedure screen that is partly different from the screen displayed based on the data generated in step S508 and in which some maintenance information is displayed in an upper area of the screen. Specifically, in a case where maintenance information corresponding to a target error code exists among pieces of maintenance information identified in step S507, the maintenance information is displayed in the upper area of the repair procedure screen. Data, such as HTML data, for displaying the repair procedure screen generated in the above-described processing is returned to the browser 331. In step S702, in a case where the maintenance information corresponding to the target error code does not exist, data similar to that in step S508 is generated.

Figure 8:
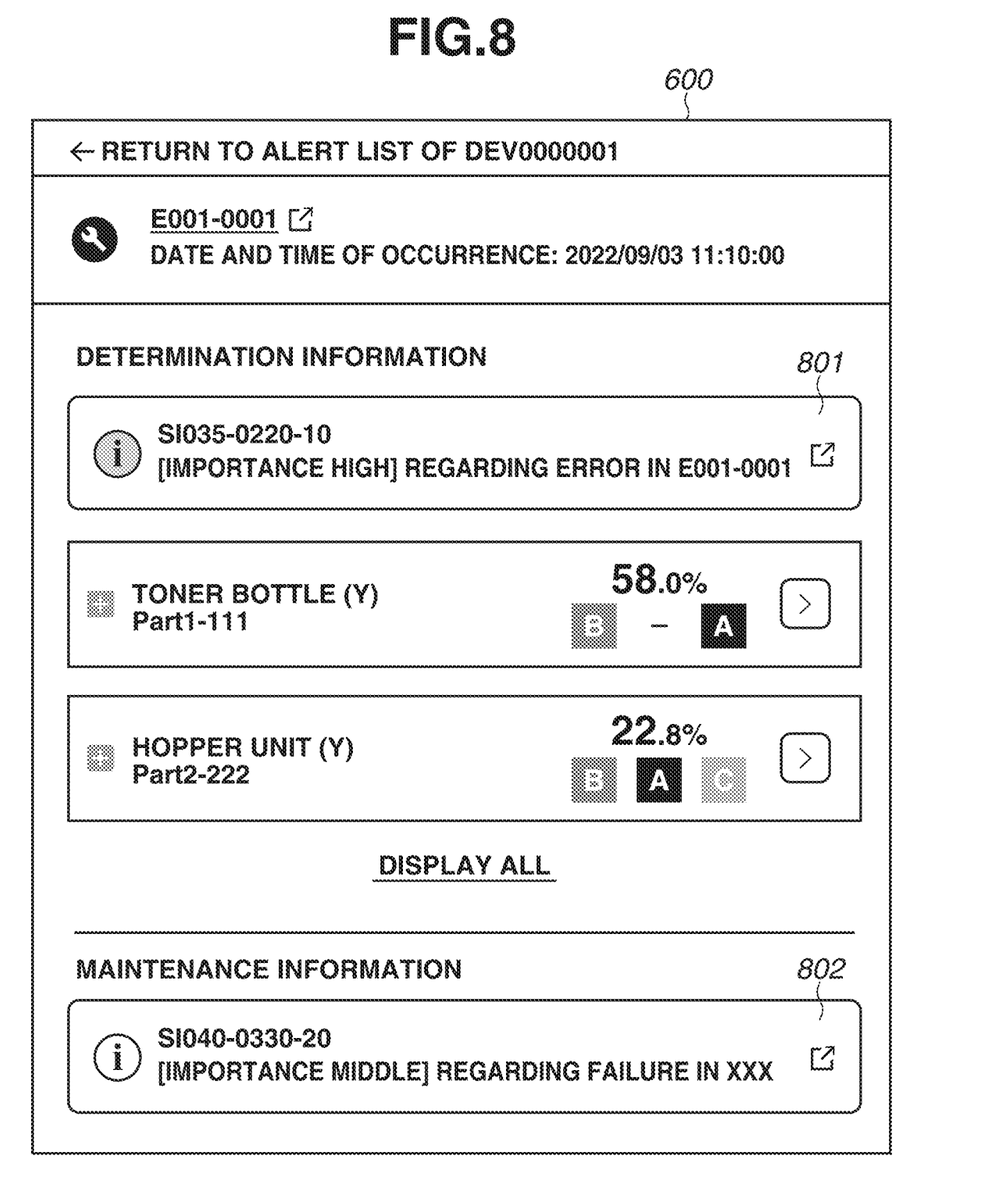
FIG. 8 illustrates an example of the repair procedure screen according to the second embodiment.

FIG. 8 illustrates an example of the repair procedure screen to be displayed by the browser 331 based on the data generated in step S702.

Maintenance information 801 is maintenance information that is managed by the maintenance information management unit 321 in association with the target error code "E001-0001". In FIG. 6, the maintenance information is displayed in the area of the maintenance information 606 together with other maintenance information, but, in FIG. 8, the maintenance information 801 is arranged and displayed in the upper part of the screen in order to emphasize that the maintenance information 801 is high priority work for the user.

Supplementary maintenance information 802 is an area in which maintenance information identified in step S507 other than the maintenance information 801 is displayed.

In the present embodiment, in a case of access from a mobile device, it is possible to present, to the user, that some pieces of maintenance information for resolving an error are high priority work.

In the present embodiment, the example is described in which some pieces of maintenance information are emphasized by being displayed at the upper part of the screen. The display method for emphasizing is not limited to the one in the example, and for example, display color or a size may be changed.

The present disclosure also includes an apparatus or a system configured by appropriately combining the above-described embodiments, and a method therefor.

The present disclosure is an apparatus or a system that is a main body that executes one or more software components (programs) that implements the functions of the above-described embodiments. Further, a method for realizing the above-described embodiments executed by the apparatus or the system is also included in the present disclosure. The program is supplied to the system or the apparatus via a network or various storage media, and is read into one or more memories and is executed by one or more computers (a CPU, a micro processing unit (MPU), or the like) of the system or the apparatus. In other words, the present disclosure also includes the program or various computer-readable storage media storing the program. Furthermore, the present disclosure can also be realized by a circuit (for example, an application specific integrated circuit (ASIC)) that implements the functions of the above-described embodiments.

According to the present disclosure, it is possible to provide a system that can reduce a possibility of overlooking maintenance information.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-010649, filed Jan. 27, 2023, which is hereby incorporated by reference herein in its entirety.

What is claimed is:

1. A system that provides information about a part for which action is to be taken in response to an error having occurred in an image processing apparatus, the system comprising:
a memory that stores instructions; and
a processor that executes the instructions to function as:
a management unit configured to manage maintenance information in association with at least one of specific identification information and an error identification (ID);
an identification unit configured to, based on a predetermined error having occurred in the image processing apparatus, identify one or more parts, replacement of which can resolve the predetermined error;
a transmission unit configured to transmit access information for providing information about the identified one or more parts;

a reception unit configured to receive a request using the access information; and a provision unit configured to provide data for displaying the information about the identified one or more parts and the maintenance information together as a response to the request, wherein the data is data for displaying only (i) the maintenance information corresponding to an error ID of the predetermined error, (ii) the maintenance information corresponding to the specific identification information of the image processing apparatus in which the predetermined error has occurred, and (iii) the maintenance information corresponding to a region to which the image processing apparatus belongs.

2. The system according to claim 1, wherein the system determines the region of which the image processing apparatus belongs based on the stored region data associated with the location code or language settings.

3. The system according to claim 1, wherein, in a case where an apparatus that has transmitted the request is a mobile device, the provision unit provides the data, including region-based maintenance information, in an emphasized manner suitable for display on the mobile device.

4. The system according to claim 1, further comprising:
a market record management unit configured to manage error information, model information about the image processing apparatus in which the error has occurred, region-based information of the image apparatus, and details of action taken as an accumulation of records of action taken for the image processing apparatus for previous errors; and a calculation unit configured to calculate a priority of the identified one or more parts based on information in which the predetermined error and a model of the image processing apparatus in which the predetermined error has occurred match, included in the market record, wherein information about the one or more parts is displayed according to the priority based on the data.

5. A method executed in a system that provides information about a part for which action is to be taken in response to an error having occurred in an image processing apparatus, the method comprising:

managing maintenance information in association with at least one of specific identification information and an error ID;

identifying, based on a predetermined error having occurred in the image processing apparatus, one or more parts, replacement of which can resolve the predetermined error;

transmitting access information for providing information about the identified one or more parts;

receiving a request using the access information; and providing data for displaying the information about the identified one or more parts and the maintenance information together as a response to the request, wherein the data is data for displaying only (i) the maintenance information corresponding to an error ID of the predetermined error, (ii) the maintenance information corresponding to the specific identification information of the image processing apparatus in which the predetermined error has occurred, and (iii) the maintenance information corresponding to a region to which the image processing apparatus belongs.

* * * * *